US010123393B1

(12) United States Patent
Soto et al.

(10) Patent No.: US 10,123,393 B1
(45) Date of Patent: Nov. 6, 2018

(54) POWER SUPPLY FOR A TWO-WIRE SMART SWITCH AND LIGHTING LOADS THEREOF

(71) Applicant: Kleverness Incorporated, Walnut, CA (US)

(72) Inventors: Gerardo Gomez Soto, Tequisistlan Tezoyuca (MX); Dan Nurko Elliot, Naucalpan de Juarez (MX)

(73) Assignee: Kleverness Incorporated, Walnut, CA (US)

( * ) Notice: Subject to any disclaimer, the term of this patent is extended or adjusted under 35 U.S.C. 154(b) by 0 days.

(21) Appl. No.: 16/002,228

(22) Filed: Jun. 7, 2018

Related U.S. Application Data

(63) Continuation-in-part of application No. 15/665,894, filed on Aug. 1, 2017, now Pat. No. 10,021,765.

(51) Int. Cl.
| | |
|---|---|
| *H05B 33/08* | (2006.01) |
| *H05B 37/02* | (2006.01) |
| *H05B 41/39* | (2006.01) |
| *H05B 41/295* | (2006.01) |

(52) U.S. Cl.
CPC ..... *H05B 37/0209* (2013.01); *H05B 33/0815* (2013.01); *H05B 33/0845* (2013.01); *H05B 41/295* (2013.01); *H05B 41/39* (2013.01)

(58) Field of Classification Search
CPC .......................... H05B 37/02; H05B 37/0227; H05B 37/0245; H05B 37/0272; H04L 67/12; G05B 13/0265; G08C 17/02; G08C 2201/20; G08C 2201/30; G08C 2201/31
USPC ................. 315/151, 291, 297, 307, 308, 312
See application file for complete search history.

(56) References Cited

U.S. PATENT DOCUMENTS

| | | |
|---|---|---|
| 5,038,081 A | 8/1991 | Maiale, Jr. et al. |
| 7,446,671 B2 | 11/2008 | Giannopoulos et al. |
| 7,687,940 B2 | 3/2010 | Mosebrook et al. |
| 8,492,984 B2 | 7/2013 | Deurenberg et al. |
| 8,664,881 B2 | 3/2014 | Newman, Jr. et al. |
| 8,892,913 B2 | 11/2014 | Newman, Jr. et al. |
| 8,922,133 B2 | 12/2014 | Hausman, Jr. et al. |
| 9,084,324 B2 | 7/2015 | Salvestrini |
| 9,250,669 B2 | 2/2016 | Blakeley et al. |
| 9,343,997 B2 | 5/2016 | Newman, Jr. et al. |
| 9,343,998 B2 | 5/2016 | Newman, Jr. et al. |
| 9,354,643 B2 | 5/2016 | Harel |
| 9,401,588 B2 | 7/2016 | Zulim et al. |

(Continued)

FOREIGN PATENT DOCUMENTS

| | | |
|---|---|---|
| AU | 7472981 A | 3/1982 |
| CN | 201188670 Y | 1/2009 |

(Continued)

*Primary Examiner* — Jimmy Vu
(74) *Attorney, Agent, or Firm* — Shumaker, Loop & Kendrick, LLP

(57) ABSTRACT

The present invention refers to an Electrical Power System (EPS) or Power Supply for a smart switch for controlling up to three independent lighting loads (3 gang) within an electrical installation that has two or three wires in the switch box (two-wire and three-wire switches). The smart switch is able to operate in a conventional switch box without access to the neutral wire. If the lighting device is a low power lighting device, only one adapter is used to avoid flickering or unintentional lighting. The Power Supply also provides a voltage signal indicating the current consumed by the lighting loads.

21 Claims, 7 Drawing Sheets

(56) References Cited

U.S. PATENT DOCUMENTS

| | | | |
|---|---|---|---|
| 9,418,809 B2 | 8/2016 | Hausman, Jr. et al. | |
| 9,572,215 B2 | 2/2017 | Datta | |
| 9,595,880 B2 | 3/2017 | Knode et al. | |
| 9,853,561 B2 | 12/2017 | Newman, Jr. et al. | |
| 9,941,811 B2 | 4/2018 | Newman, Jr. et al. | |
| 9,986,624 B2 | 5/2018 | Vangeel et al. | |
| 10,021,765 B1 | 7/2018 | Elliot et al. | |
| 2006/0049935 A1* | 3/2006 | Giannopoulos | H05B 37/02 340/533 |
| 2010/0101924 A1 | 4/2010 | Wu et al. | |
| 2013/0300545 A1 | 11/2013 | Rao et al. | |
| 2015/0048753 A1* | 2/2015 | Chen | H05B 33/0806 315/250 |
| 2016/0124453 A1 | 5/2016 | Blakeley et al. | |

FOREIGN PATENT DOCUMENTS

| | | |
|---|---|---|
| CN | 201589976 U | 9/2010 |
| CN | 102063102 A | 5/2011 |
| CN | 202551079 U | 11/2012 |
| CN | 102882752 A | 1/2013 |
| CN | 203250198 A | 10/2013 |
| CN | 103475554 A | 12/2013 |
| CN | 203339430 U | 12/2013 |
| CN | 103596294 A | 2/2014 |
| CN | 104330974 A | 2/2015 |
| CN | 204156886 U | 2/2015 |
| CN | 204190090 U | 3/2015 |
| CN | 204217165 U | 3/2015 |
| CN | 204241946 U | 4/2015 |
| CN | 204719434 U | 10/2015 |
| CN | 204719435 U | 10/2015 |
| CN | 204719436 U | 10/2015 |
| CN | 204719514 U | 10/2015 |
| CN | 204719515 U | 10/2015 |
| CN | 204832937 U | 12/2015 |
| CN | 105338699 A | 2/2016 |
| CN | 105632162 A | 6/2016 |
| CN | 205388682 U | 7/2016 |
| CN | 205726601 U | 11/2016 |
| CN | 106325240 A | 1/2017 |
| CN | 205921804 U | 2/2017 |
| IN | 20130263414 A | 6/2016 |
| JP | 2012174488 A | 9/2012 |
| KR | 2013110763 A1 | 10/2013 |
| WO | 2009099082 A1 | 8/2009 |
| WO | 2016014957 A1 | 1/2016 |

* cited by examiner

POWER SUPPLY FOR A TWO-WIRE SMART SWITCH AND LIGHTING LOADS THEREOF

CROSS REFERENCE TO RELATED APPLICATION(S)

This application is a Continuation-In-Part claiming priority from U.S. patent application Ser. No. 15/665,894, filed Aug. 1, 2017, entitled INTELLIGENT SWITCH DEVICE AND CENTRAL CONTROL SYSTEM THEREOF, the entire disclosures of which are hereby incorporated by reference.

TECHNICAL FIELD OF THE INVENTION

The present invention relates to the technical field of power delivery to lighting devices, more particularly, to a Power Supply or Electric Power System for a two-wire or three-wire smart or intelligent switch and the lighting loads connected to the switch.

BACKGROUND OF THE INVENTION

In recent years, there has been a development in technology that has been applied in the automation of houses, buildings, etc., which has been termed as home automation or domotics.

A key part of home automation is the automation of lighting systems, with devices such as intelligent switches, also known as smart switches. With the quick development of these technologies, people have begun to adopt smart switches for their homes. Smart switches allow a user to turn on and off, dim a lighting device, control it remotely or measure power consumption.

Smart switches usually need three wires to function, that is, a hot wire from the alternating-current (AC) source is connected to one terminal of the smart switch, a second wire is connected to another terminal of the smart switch and the lighting device, and a neutral wire from the AC source is connected to a third terminal of the smart switch, which closes the circuit inside the smart switch, allowing current flow for the operation of the electronics of the smart switch.

Usually, the electrical wiring of homes has only the first two wires in a switch box or wallbox, with the neutral wire absent from the switch box, since common (non-smart) switches or dimmers are connected in series between the AC source and the lighting device. This yields the problem of having to rewire the entire home in order to bring a neutral wire from the AC source to the switch box.

Some smart switches measure the power consumption by means of their power supply. Said power consumption is calculated for an entire circuit (one way, line, or gang), i.e. for all the electric loads combined connected to the circuit. Therefore, a user cannot measure the power consumption of each individual load. The power consumed by each individual load is useful to know if a lighting device is consuming more power than usual or to know when to replace a lighting device.

A power source for a two-wire smart switch is disclosed in U.S. patent application Ser. Nos. 12/952,920 and 15/131,444 and their families. However, said implementations need an adapter or artificial load for each circuit to be controlled by the switch, i.e. one adapter for each switch in a gang switch. Another two-wire power supply for a smart switch is described in U.S. Pat. No. 8,892,913 B2. However, the power delivered by said power supply is very low, since it is provided by a capacitor that gets charged near the zero-crossing of the AC wave. If the capacitor is not fully charged, the power supply may turn off some of its elements, like an LED or a communications module. Another disadvantage of US '913 B2 is that the circuit is fairly complex, requiring a microprocessor to control the power supply. The microprocessor is powered by the power supply, therefore, if any of the two were to fail, the other would fail too.

A device for power measurement is disclosed in U.S. patent application Ser. No. 14/991,133, however, said device does not measure the power consumption of an individual load, but the combined loads in a circuit.

The power measurement in a two-wire load control device described in U.S. Pat. No. 9,250,669 B2 discloses a current measuring circuit that includes only a resistor (e.g., a micro-Ohm resistor) that may be used to measure a current to be inputted in ADC, that passes through the two-wire load control device. Wherein the control circuit is electrically connected between the controller and a controllably conductive device (a bidirectional semiconductor). However, the two-wire load control device can only operate one conductive device, therefore, control only a single lighting load at the same time. Additionally, the two-wire load control device relies on an energy storage device (a capacitor), therefore the power is not supplied continuously.

Another dimmer switch for use with lighting circuits having three-way switches is described in U.S. Pat. No. 7,687,940 B2. However, the smart switch can be installed only in three or four-way switches systems, wherein the lighting control system has implemented a sensing circuit that has a current sense transformer that only operates above a minimum operating frequency, for example, 100 kHz, such that current only flows in the secondary winding when the current waveform through the primary winding has a frequency above the minimum operating frequency, wherein the system includes only two controllably conductive devices or bidirectional semiconductor switches, such as a TRIACs. However, the power supply of the system sometimes is unable to supply power to the controller through the duration of a toggle or switching of the three-way switch, and the controller of the system will reset.

A load control device for high-efficiency loads is disclosed in U.S. Pat. No. 9,343,997 B2, U.S. Pat. No. 9,343,998 and U.S. Pat. No. 9,853,561 B2. The control device comprises only one bidirectional semiconductor switch that comprises a control input (e.g., a gate), which may receive control signals for rendering the bidirectional semiconductor switch conductive and non-conductive. However, the load control device has a mechanical switch that controls the powering of the whole device, and when the mechanical switch is off, the system is unpowered, therefore requiring the physical input from a user to reactivate the load control device. Additionally, the load control device it is limited to control only one lighting load at a time.

A smart electronic switch for low-power loads is disclosed in U.S. Pat. No. 8,922,133 B2 and U.S. Pat. No. 9,418,809 B2, wherein the electronic switch comprises two power supplies: an on-state power supply and an off-state power supply. Both power supplies, operate to generate a DC supply voltage across an output capacitor. Wherein the electronic switch has implemented a bidirectional semiconductor switch that is coupled in series electrical connection with the parallel combination of a relay and an on-state power supply. The on-state power supply operates to generate the DC supply voltage when the relay is closed and the lighting load is on. However, this system is not compatible with a three-wire switch box. Additionally, the two-wire load control device relies on an energy storage device (a capacitor), and a relay, which are prone to failure.

Therefore, is desirable a power supply for a smart switch that operates with two or three wires and controls up to three lines with multiple lighting devices, with only one adapter per line, supplies enough power to power a microcontroller or microprocessor, a user interface and a communications module; and measures power consumption of individual lighting loads.

SUMMARY OF THE INVENTION

The present invention discloses a Power Supply or Electric Power System for an intelligent or smart switch device able to switch on or off any kind of lighting load, configured to be installed in a conventional home electrical installation for two-wire switch boxes that are able to control up to three independent lighting loads as in a 3 gang switch, without the need to modify the electrical wiring installation. The smart switch is also able to work with a three-wire configuration (phase/hot, neutral and the wire from the load). If the three wires are available in the switch box, the user is able to select whether to use two or three wires.

The Power Supply supplies enough power for a variety of peripherals and components of the smart switch, e.g. a wireless communication module, a user interface with LEDs, and a microprocessor or microcontroller. The supply of power is constant and is not affected by whether there are one, two or three independent lighting loads.

When the lighting loads are off, the Power Supply closes the circuit by letting a small amount of current to pass from the AC mains through one of the lighting loads, thus obtaining energy for powering the smart switch components. The current passing through the lighting load should be small enough to not let the lighting load turn on. If the lighting load is a low power lighting load (e.g. an LED or CFL), an adapter parallel to the load may be used in order to avoid the flicker of the same. There is no need to use additional adapters if there are more lighting loads connected to the smart switch in a 2 or 3 gang configuration.

The Power Supply measures the power consumed by the loads via the external microcontroller or microprocessor by outputting a voltage signal proportional to the current consumed flowing through the lighting loads.

Additionally, the Power Supply is compatible with American and European switch boxes and electrical standards, i.e. 110/120 Volts and 60 Hz or 220/240 Volts and 50 Hz.

BRIEF DESCRIPTION OF THE DRAWINGS

The invention may be better understood by referring to the following figures.

DETAILED DESCRIPTION OF THE INVENTION

First Embodiment of the Invention

Figure 1:
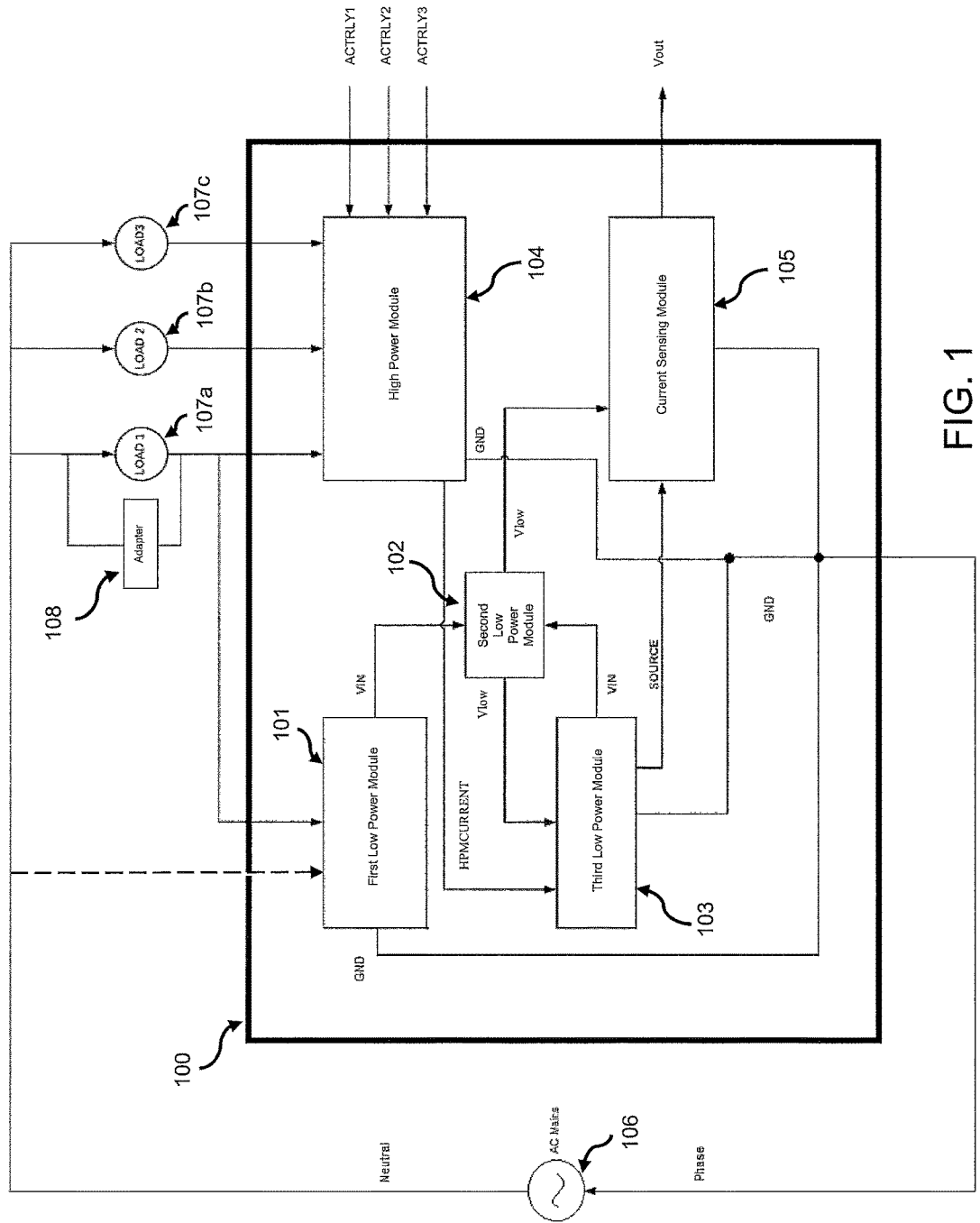
FIG. 1 is a block diagram depicting the functioning of a first embodiment of the Power Supply.

FIG. 1 depicts a block diagram of a first embodiment of the invention. The Power Supply 100, also called Electrical Power System, EPS, has five submodules: A first low power module 101, a second low power module 102, a third low power module 103, a high power module 104 and a current sensing module 105. The Power Supply 100 is connected with up to three lighting loads 107a, 107b and 107c and to the AC mains 106.

An overall description of the system is as follows. A first mode of operation is implemented when there are three wires available in the switch box: hot/phase wire, neutral wire and the lighting load wire. The neutral and phase wires of the AC mains 106 are connected and supplying power directly to the first low power module 101. The third wire (neutral) is depicted in FIG. 1 as a dashed line.

Usually there are only two wires available in the switch box for a single switch (not taking into account the earth or ground wire). The two wires that are usually located in a switch box are the phase wire and the wire from the lighting load. There are 2 or 3 gang switches that control two or three independent loads, but they still lack the neutral wire. It is to be noted that, in some electrical installations, the phase wire may be absent from the switch box and replaced with the neutral wire. If this is the case, the Power Supply 100 is able to operate with the neutral wire and the wire from the lighting load. For illustrative purposes, the wire coming from the AC mains will be treated as the phase wire, since the functioning of the Power Supply 100 remains the same. The Power Supply 100 has a selector switch for selecting between the first or the second modes of operation, depending on the availability of the neutral wire in the switch box at the time of installation.

If there are two wires only in the switch box, the second mode of operation is used. This second mode of operation is composed by two cases, when the load 107a is in its on state and when the same is in its off state. The case when the load 107a is in its off state will be described first.

Off State Functioning

In this case, power is needed to feed the electronic circuits that control the smart switch and other peripheral circuits, such as a communications module, or a user interface. The wire from the first load, load 107a, is connected to the first low power module 101 and the high power module 104. When the load 107a is in its off state, current will flow only through the first low power module 101, since the high power module 104 will act as an open circuit. The first low power module 101 accesses the neutral wire needed to close the circuit via the load 107a, by letting a small current pass through the lighting load 107a and the Power Supply 100 itself.

If the load 107a is a low power lighting load like a Compact Fluorescent Lamp (CFL) or a Light Emitting Diode (LED), the current flowing through the lighting load 107a and the Power Supply 100 may be enough to make the lighting load flicker, or it may be even that the impedance of the lighting load is low enough for it to illuminate. A single low power lighting load adapter 108 may be connected in parallel to the lighting load to prevent these unwanted effects. The low power lighting load adapter 108 provides an additional path for the current to flow, therefore limiting the current that flows through the lighting load 107a. Lighting loads 107b and 107c do not need a low power lighting load adapter. The low power lighting load adapter 108 may comprise resistive, capacitive, inductive elements, or a combination thereof.

When the lighting load 107a is in its off state, a relatively small current flowing through the Power Supply 100 powers the first low power module 101, which receives the power from the AC mains 106 and outputs a constant first level DC voltage (Vin). In a preferred embodiment, the first low power module 101 is implemented by means of a non-isolated flyback converter that includes a High Precision CC/CV (Constant Current/Constant Voltage) Primary-Side PWM Power Switch.

The voltage Vin is fed into a second low power module 102, which steps down the voltage to a second level DC voltage (Vlow). The Vlow is used to power an external microcontroller or microprocessor which controls and commands the switching on or off of the lighting loads 107a, 107b and 107c. In a preferred embodiment, the second low power module 102 is implemented by means of a buck converter.

On State Functioning

Figure 2:
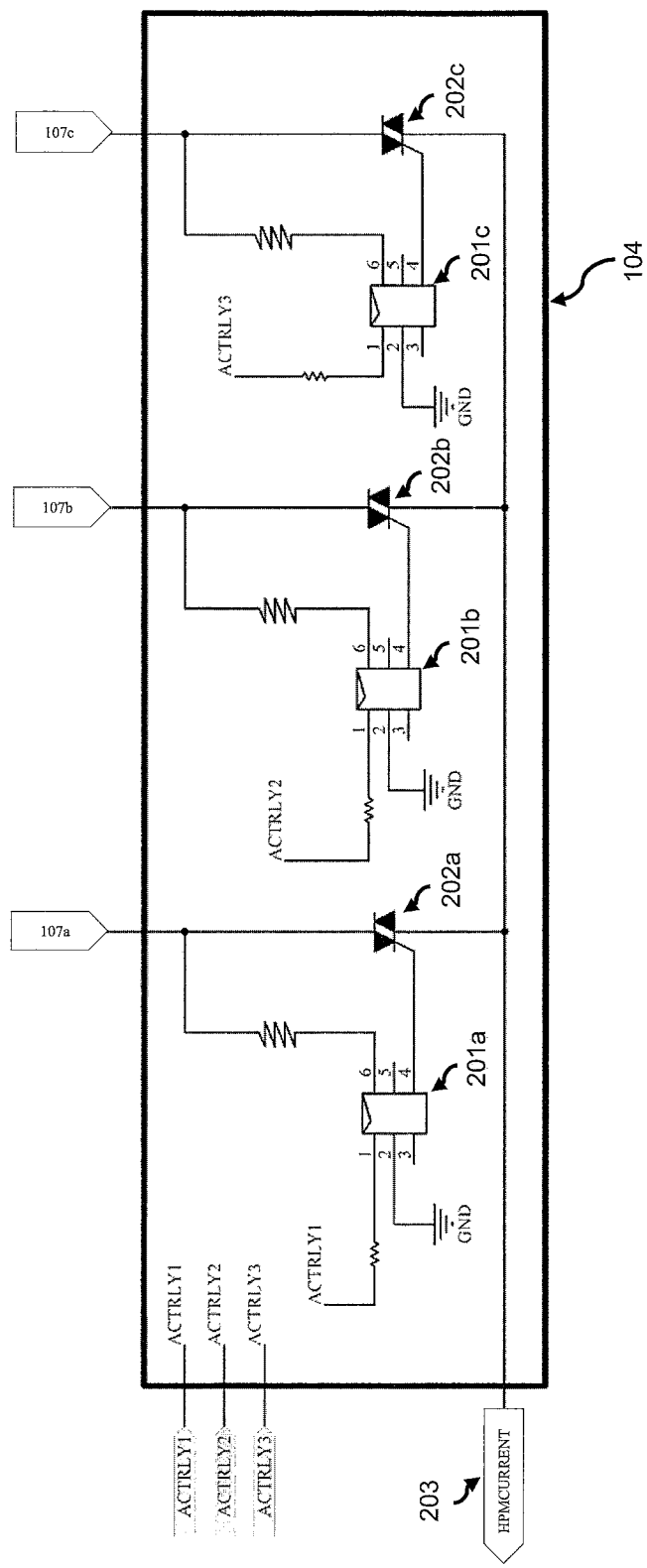
FIG. 2 is an electrical diagram of a preferred embodiment of the high power module.

FIG. 2 depicts a preferred embodiment of the high power module 104. An external microcontroller sends activation signals ACTRLY1, ACTRLY2 and ACTRLY3 that are employed to trigger a circuit that switches on or off the lighting loads 107a, 107b and 107c. The circuit that switches on or off the lighting loads has an isolation stage that isolates the external microcontroller from the AC mains 106 power, implemented by means of opto-isolators 201a, 201b, 201c, which receive the activation signals and let current to flow into the gate of TRIACs 202a, 202b and 202c, that are connected to the lighting loads 107a, 107b and 107c, respectively. In response to the activation signals, the terminals of the TRIACs act as a short circuit, allowing the AC mains 106 current to flow through the lighting loads 107a, 107b and 107c.

If the load 107a is switched on, the voltage drop on the same is almost of the same magnitude as the AC mains voltage 106. This causes a voltage divider effect that leaves almost no voltage in the first low power module 101, causing a short circuit effect, therefore, leaving the Power Source 100 with not enough voltage to function. To overcome this issue, the current that goes through the TRIACs 202a, 202b and 202c exits the high power module 104 (HPMCURRENT current 203) and enters the third low power module 103 that deviates a fraction of the HPMCURRENT current 203 to keep the powering the Power Supply 100.

Figure 3:
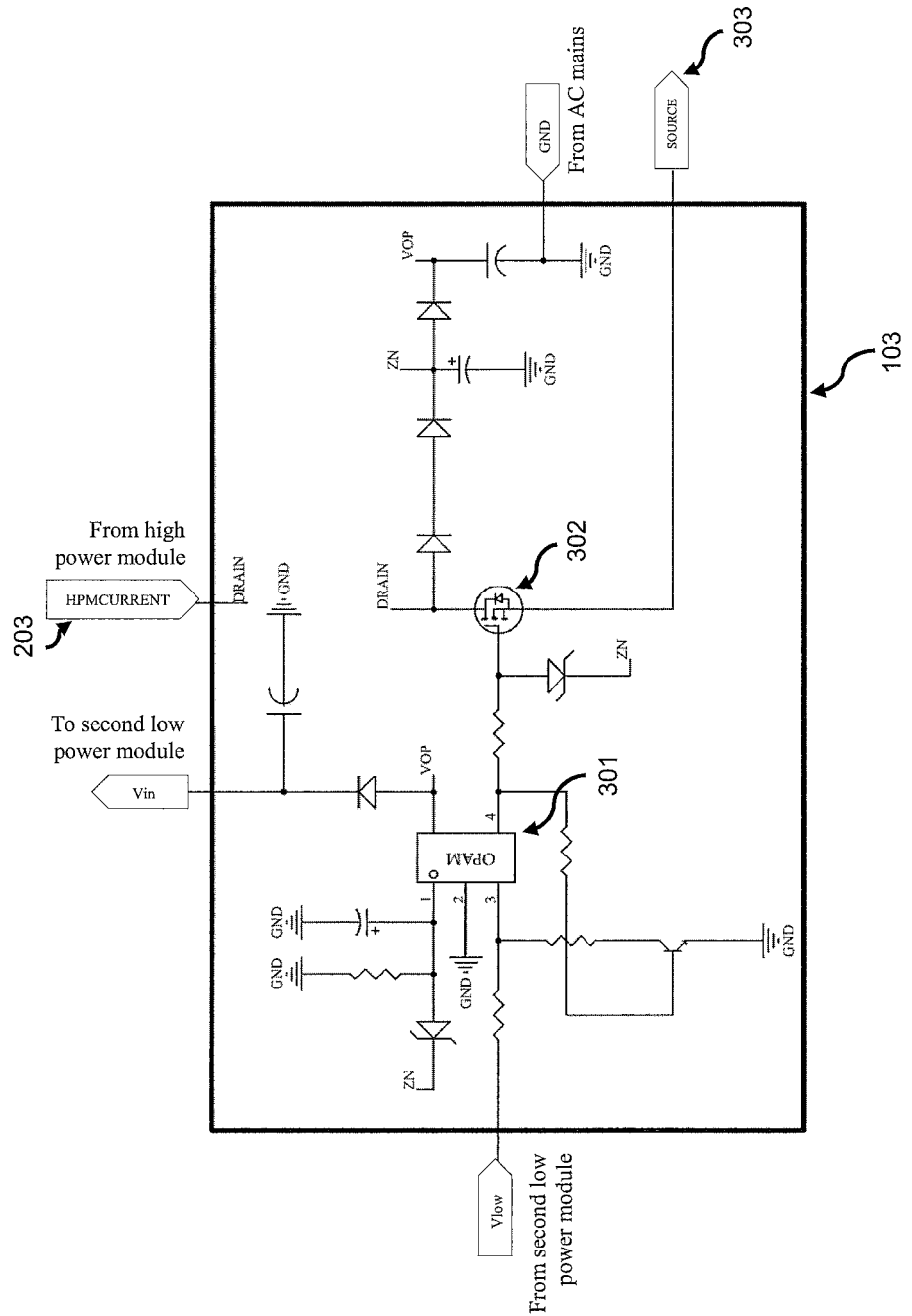
FIG. 3 is an electrical diagram of a preferred embodiment of the third low power module.

A preferred embodiment of the third low power module 103 is depicted in FIG. 3. The third low power module 103 performs two main functions, providing power to the Power Supply 100 when the load 107a is in its on state and providing a SOURCE current 303 that will be used to measure the power consumption of the loads 107a, 107b and 107c.

The HPMCURRENT current 203 enters the third low power module 103 and part of it is rectified and regulated to generate the first level low voltage (Vin). In a preferred embodiment, the rectification and regulation is performed by means of an arrangement of diodes and Zener diodes. The third low power module 103 is used to feed the second low power module 102, since the current supplied by the first low power module 101 is not enough to keep the Power Supply 100 functioning. Vin is also used to supply power to a comparator, which in a preferred embodiment comprises of an OPAMP 301 that compares the second level low voltage Vlow with the rectified voltage and outputs an oscillating signal that activates or deactivates the gate of the MOSFET 302, which outputs a SOURCE current 303 that is used to calculate the power consumed by the loads 107a, 107b and 107c.

Figure 4:
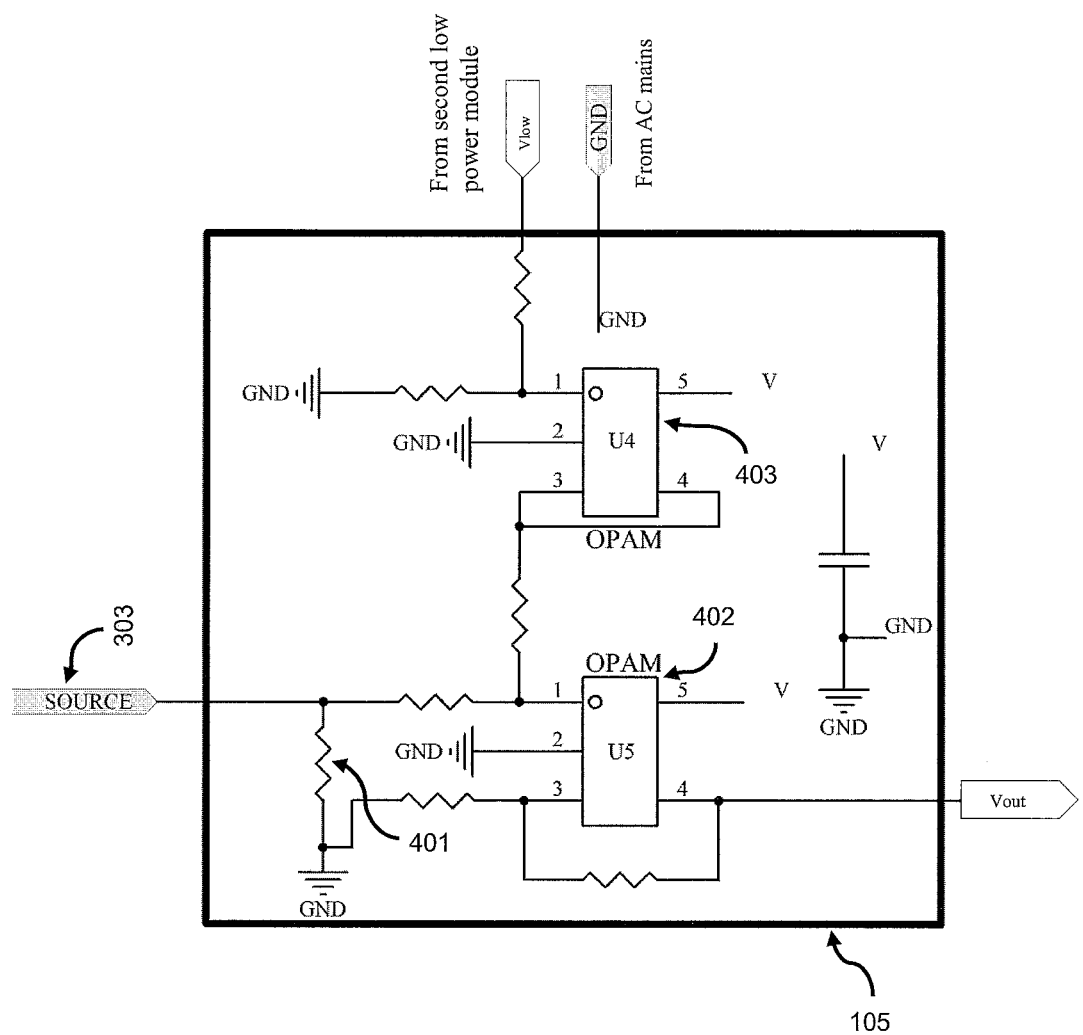
FIG. 4 is an electrical diagram of a first embodiment of the current sensing circuit.

The SOURCE current 303 enters the current sensing module 105, as depicted in FIG. 4, which converts the SOURCE current 303 into a voltage signal (Vout) to be fed to the ADC module of the external microcontroller or microprocessor. The current sensing module 105 is arranged in such a way that the SOURCE current 303 passes through a shunt resistor 401 which allows a small current to pass through an amplifying stage, which in a preferred embodiment is performed by means of the OPAMP 402 which amplifies the signal of the SOURCE current, and additionally the OPAMP 403 adds an offset voltage to the signal of the SOURCE current and outputs Vout, in order to make the Vout voltage compatible with the voltage level of the ADC module of the external microcontroller.

Both cases (on state functioning and off state functioning) allow for the external microcontroller to be energized by the second low power module 102, which is always powered by either the first low power module 101 or the third low power module 103. Therefore, the high power module 104 is able to switch on or off all loads, regardless of the state of lighting loads 107b and 107c.

Second Embodiment of the Invention

Figure 5:
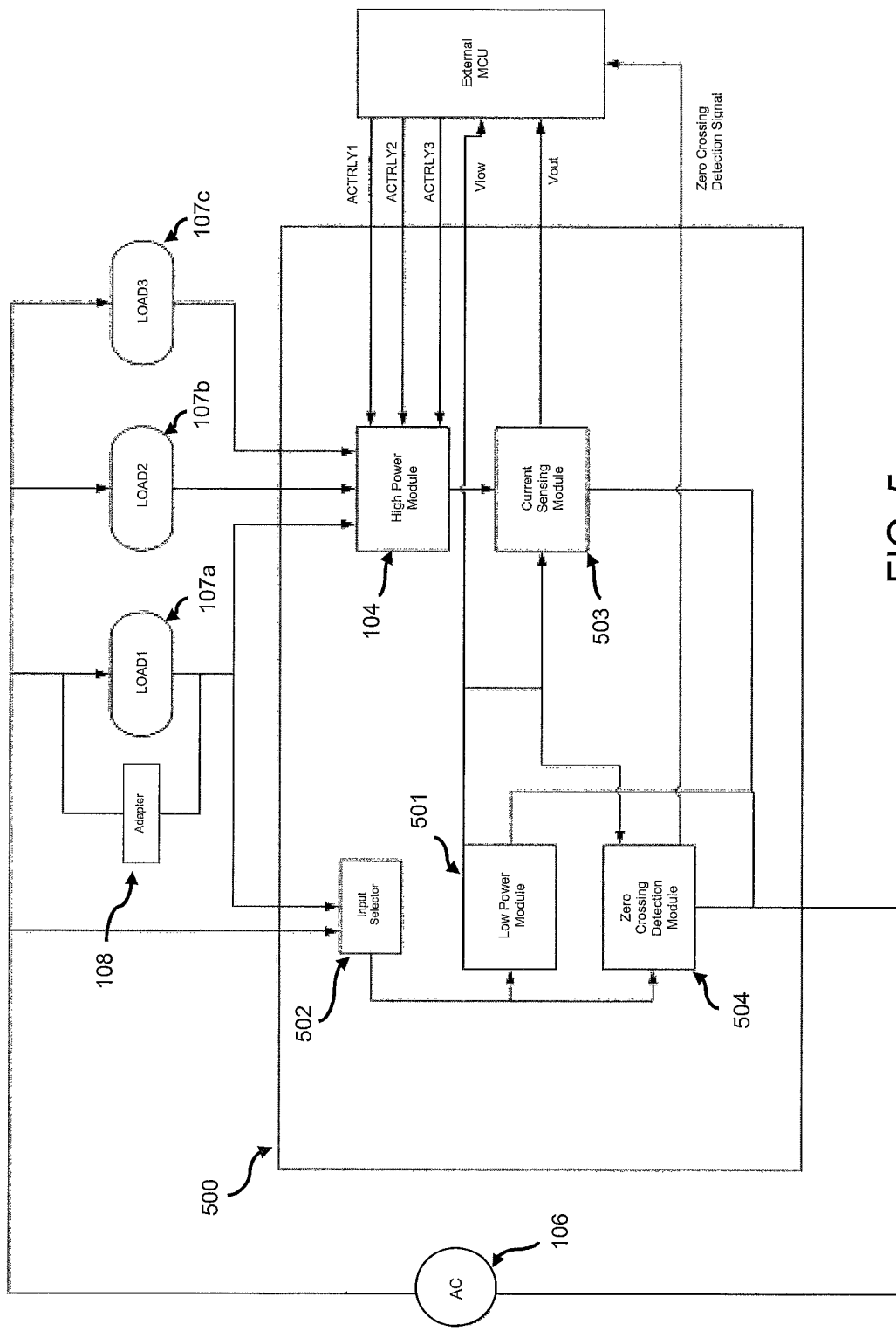
FIG. 5 is a block diagram depicting the functioning of a second embodiment of the Power Supply.

A simplified block diagram 500 of a second embodiment of the invention is depicted in FIG. 5. The second embodiment of the invention consists of a low power module 501 that converts directly from AC to the second level DC voltage (Vlow), an input selector 502 for automatically selecting between the three-wire or the two-wire configurations, a high power module 104 as the one described in the first embodiment of the invention and depicted in FIG. 2, a current sensing module 503, a zero crossing detection module 504, lighting loads 107a, 107b, 107c and a low power lighting load adapter 108 as described in the first embodiment of the invention.

Off State Functioning

In this case, the wire from the first lighting load, lighting load 107a, is connected to the input selector 502 and the high power module 104. When the lighting load 107a is in its off state, current will flow only through the input selector 502, since the high power module 104 will act as an open circuit. The input selector 502 leads to the low power module 501 that accesses the neutral wire needed to close the circuit via the load 107a, by letting a small current pass through the lighting load 107a and the Power Supply 500 itself.

If load 107a is a low power lighting load like a Compact Fluorescent Lamp (CFL) or a Light Emitting Diode (LED), the current flowing through the lighting load 107a and the Power Supply 500 may be enough to make the lighting load flicker, or it may be even that the impedance of the lighting load is low enough for it to illuminate. A single low power lighting load adapter 108 may be connected in parallel to the lighting load to prevent these unwanted effects. Lighting loads 107b and 107c do not need a low power lighting load adapter.

When the lighting load 107a is in its off state, a relatively small current flowing through the Power Supply 500 powers the low power module 501, which receives the power from the AC mains 106 and outputs the constant second level DC voltage (Vlow). In this embodiment of the invention, the electronic components are galvanically isolated from the AC current from AC mains 106. The isolation in the low power module 501 is implemented by a flyback converter with a high voltage flyback switcher circuit and an isolated transformer, which outputs the second level DC voltage (Vlow) with ground isolated from the AC mains 106 that is necessary to power the zero crossing detection module 504, the current sensing module 503 and an external microcontroller.

On State Functioning

Referring to FIG. 2 again, the activation signals ACTRLY1, ACTRLY2 and ACTRLY3 are used to trigger a circuit that switches on or off the lighting loads 107*a*, 107*b* and 107*c* in the high power module 104. In this module, the galvanic isolation is performed by means of opto-isolators 201*a*, 201*b*, 201*c*, which receive the activation signals and let current to flow into the gate of TRIACs 202*a*, 202*b* and 202*c*, that are connected to the lighting loads 107*a*, 107*b* and 107*c*, respectively. In response to the activation signals, the terminals of the TRIAC act as a short circuit, allowing the AC mains 106 current to flow through the lighting loads 107*a*, 107*b* and 107*c*. The activation signals ACTRLY1, ACTRLY2 and ACTRLY3 are provided by the external microcontroller or microprocessor.

If the lighting load 107*a* is switched on, the voltage drop on the same is almost of the same magnitude as the AC mains voltage 106. This causes a voltage divider effect that leaves almost no voltage in the low power module 501, causing a short circuit effect, therefore, leaving the Power Source 500 with not enough voltage to function. To overcome this issue, the external microcontroller needs to detect when the AC mains 106 crosses zero, in order to draw a small amount of current just after the AC wave crosses zero and then turn on the lighting load 107*a*. The zero crossing detection module 504 is responsible for sending the zero crossing detection signal to the external microcontroller. The external microcontroller then waits for a period of time after the zero crossing detection before sending the activation signal ACTRLY1. In this period of time the lighting load 107*a* is off and the low power module 501 receives enough power to operate until the next zero crossing. With this configuration, the lighting loads 107*b* and 107*c* do not need to be turned off after the zero crossing and may be in its on state all the time, since their circuits are independent of the low power module 501.

Figure 6:
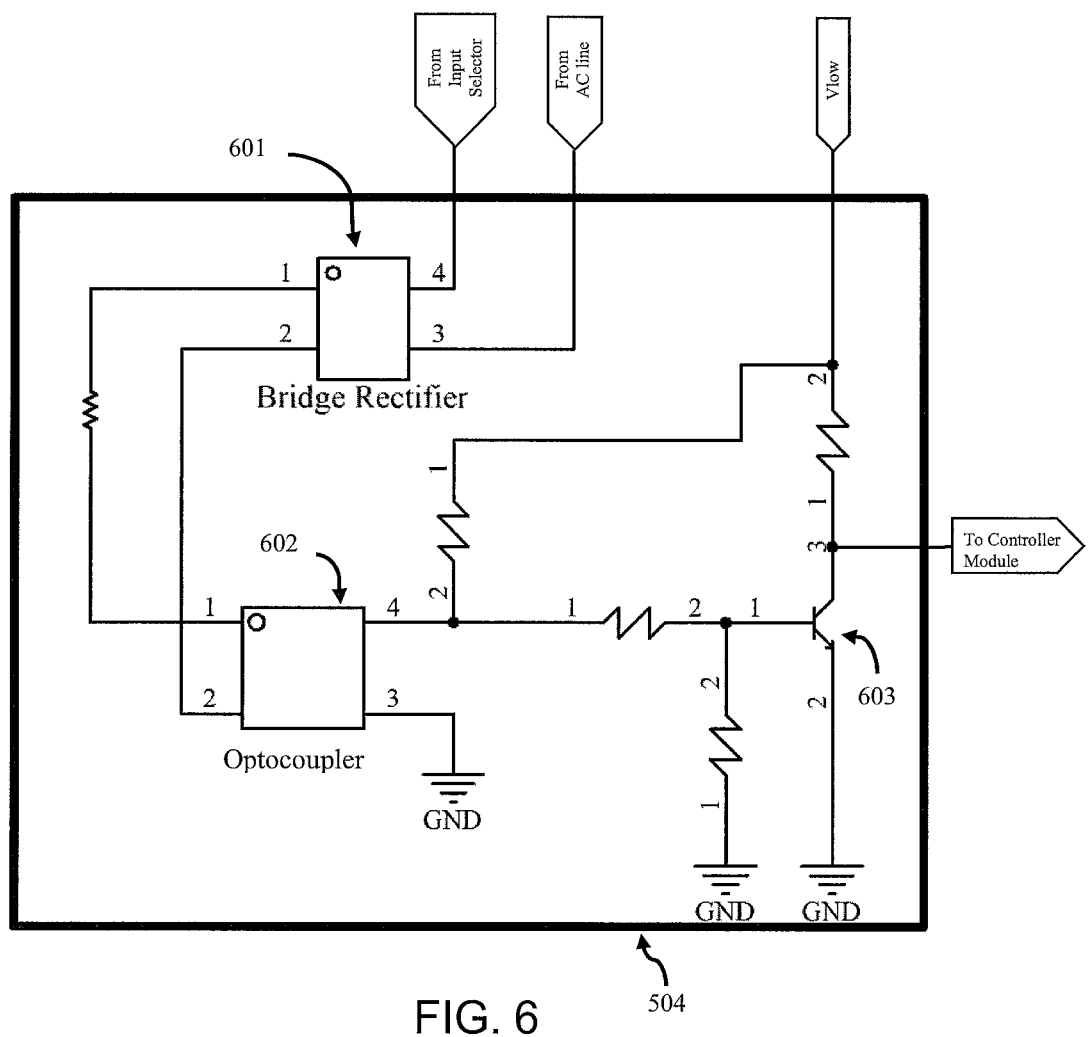
FIG. 6 is a preferred embodiment of the zero crossing detection module.

The zero crossing detection module 504 is depicted in FIG. 6 and employs a bridge rectifier 601 connected to the AC voltage from the input selector 502 and the phase wire from the AC mains 106. The rectified AC signal is outputted to an opto-isolator or optocoupler 602 that galvanically isolates the zero crossing module from the AC mains 106. The output of the opto-isolator 602 is received by the base of the transistor 603. The transistor 603 then outputs a HIGH signal (Zero Crossing Signal) to the controller module 103 when the current in its base is zero, i.e., when the AC wave crosses zero, in order to control the timing of the turning on or off of the lighting load 107. The current that goes through the TRIACs 202*a*, 202*b* and 202*c* (HPMCURRENT 203) exits the high power module 104 and enters the current sensing module 503 for measuring the power consumption of the lighting loads.

Figure 7:
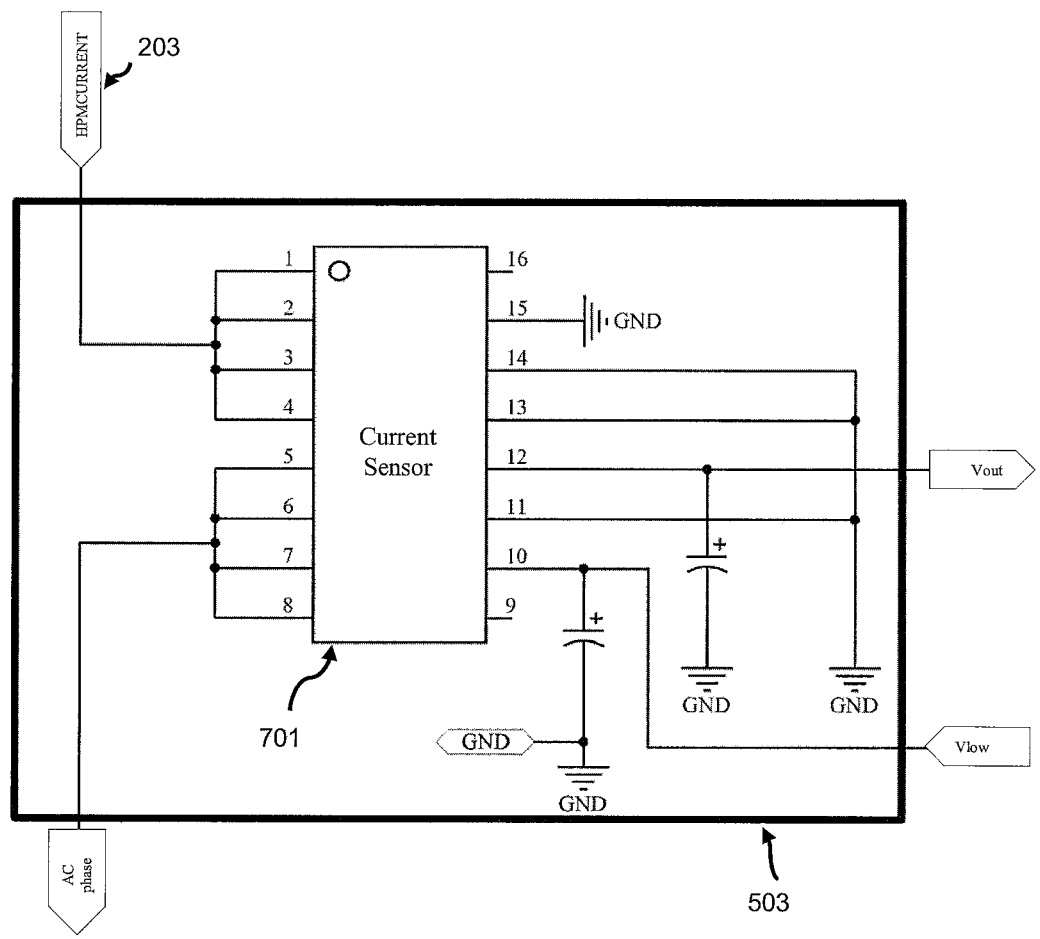
FIG. 7 is an electrical diagram of a second embodiment of the current sensing circuit.

A preferred embodiment of the current sensing module 503 is depicted in FIG. 7, which converts the HPMCURRENT current 203 that exits the high power module 104 into a voltage signal (Vout) to be fed to the ADC of the external microcontroller or microprocessor. In this embodiment, the current sensing module 503 is galvanically isolated from the AC mains 106. The current sensing module 503 may perform the galvanic isolation with a device such as a hall effect sensor 701. The hall effect sensor 701 measures the HPMCURRENT 203 and converts it to a Vout voltage. Vout is sent to the ADC module of the external microcontroller in order to calculate the power consumption of the lighting loads 107*a*, 107*b* and 107*c*. Vout is also used to determine the type of technology connected to the smart switch, i.e., incandescent, CFL or LED bulb.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention should only be limited by the appended claims.

What is claimed is:

1. A power supply powered by main electricity for a two-wire or three-wire smart switch, connected to at least one lighting load, to control the power on and power off of the at least one lighting load, the power supply comprises:
   a first low power module;
   a second low power module;
   a third low power module;
   a high power module;
   a current sensing module;
   a low power lighting load adapter;
   wherein:
   if the smart switch has a two-wire configuration and a first one of the least one lighting load is a low power lighting load, the low power lighting load adapter is connected in parallel to the first one of the at least one lighting load and AC power from the main electricity will flow from the first one of the at least one lighting load and the low power lighting load adapter to the low power module when the first one of the least one lighting load is in an off state;
   if the smart switch has a two-wire configuration and the first one of the at least one lighting load is not a low power lighting load, the low power lighting load adapter is not connected to the first one of the at least one lighting load and the AC power will flow from the first one of the at least one lighting load to the low power module when the first one of the at least one lighting load is in an off state,
   if the smart switch has a three-wire configuration, the AC power will flow from a neutral and a phase wires to the first low power module;
   the first low power module converts the AC power from the main electricity into a first level DC voltage and outputs the first level DC voltage to the second low power module;
   the second low power module converts the first level DC voltage from the first low power module into a second level DC voltage when the first one of the at least one lighting load is in an off state;
   the high power module turns on the at least one lighting load, when a respective one of at least one activation signal is received from an external controller module that is powered by the second low level DC voltage, and a shunt current flows out of the high power module when the at least one lighting load is in an on state;

the third low power module receives the shunt current and uses it to output the first level DC voltage to the second low power module when the first one of the at least one lighting load is in an on state;

the second low power module converts the first level DC voltage from the third low power module into a second level DC voltage when the first one of the at least one lighting load is in an on state;

the current sensing module is powered by the second level DC voltage and converts the shunt current from the high power module into a current-voltage signal to be outputted to the external controller module.

2. The power supply of claim 1, wherein the two-wire configuration consists of a phase wire and a wire from the lighting load.

3. The power supply of claim 1, wherein the three-wire configuration consists of a phase wire, a neutral wire and a wire from the lighting load.

4. The power supply of claim 1, wherein the first low power module comprises a selector switch to select between the two-wire or three-wire configurations.

5. The power supply of claim 1, wherein the at least one lighting load is one lighting load.

6. The power supply of claim 1, wherein the at least one lighting load are two lighting loads.

7. The power supply of claim 1, wherein the at least one lighting load are three lighting loads.

8. The power supply of claim 1, wherein the at least one lighting load is a resistive lighting load, a CFL lighting load, an LED lighting load or a combination thereof.

9. The power supply of claim 1, wherein the low power lighting load adapter comprises one of a resistive adapter, a capacitive adapter, an inductive adapter or a combination thereof.

10. The power supply of claim 1, wherein the switching of the on and off states of the at least one lighting load in the high power module is performed via at least one bidirectional semiconductor device.

11. The power supply of claim 1, wherein the at least one activation signal is electrically isolated from the main electricity.

12. A power supply powered by main electricity for a two-wire or three-wire smart switch, connected to at least one lighting load, to control the power on and power off of the at least one lighting load, the power supply comprises:
    a low power module;
    a high power module;
    a current sensing module;
    a low power lighting load adapter;
    a zero detection crossing module;
    wherein:
    if the smart switch has a two-wire configuration and a first one of the least one lighting load is a low power lighting load, the low power lighting load adapter is connected in parallel to the first one of the at least one lighting load and AC power from the main electricity will flow from the first one of the at least one lighting load and the low power lighting load adapter to the low power module when the first one of the least one lighting load is in an off state;

if the smart switch has a two-wire configuration and the first one of the at least one lighting load is not a low power lighting load, the low power lighting load adapter is not connected to the first one of the at least one lighting load and the AC power will flow from the first one of the at least one lighting load to the low power module when the first one of the at least one lighting load is in an off state;

if the smart switch has a three-wire configuration, the AC power will flow from a neutral and a phase wire of the main electricity to the low power module;

the low power module converts the AC power from the main electricity into a low level DC voltage;

the high power module turns on the at least one lighting load for less than a half cycle of the main electricity, when a respective one of at least one activation signal is received from an external controller module that is powered by the low level DC voltage, and a shunt current flows out of the high power module when the at least one lighting load is in an on state;

the zero crossing module outputs a zero crossing signal to the external controller module when a wave of the AC main voltage crosses zero volts, for the external controller module to synchronize the timing and delay of the activation signal with the phase of the main electricity;

the current sensing module is powered by the low level DC voltage and converts the shunt current from the high power module into a current-voltage signal to be outputted to the external controller module; and the low power module, the high power module, the current sensing module and the zero crossing detecting module are galvanically isolated from the main electricity.

13. The power supply of claim 12, wherein the two-wire configuration consists of a phase wire and a wire from the at least one lighting load.

14. The power supply of claim 12, wherein the three-wire configuration consists of a phase wire, a neutral wire and a wire from the at least one lighting load.

15. The power supply of claim 12, wherein an input selector is able to automatically select between the two-wire or three-wire configurations.

16. The power supply of claim 12, wherein the at least one lighting load is one lighting load.

17. The power supply of claim 12, wherein the at least one lighting load are two lighting loads.

18. The power supply of claim 12, wherein the at least one lighting load are three lighting loads.

19. The power supply of claim 12, wherein the at least one lighting load is a resistive lighting load, a CFL lighting load, an LED lighting load or a combination thereof.

20. The power supply of claim 12, wherein the low power lighting load adapter comprises one of a resistive adapter, a capacitive adapter, an inductive adapter or a combination thereof.

21. The power supply of claim 12, wherein the switching of the on and off states of the at least one lighting load in the high power module is performed via at least one bidirectional semiconductor device.

* * * * *